United States Patent Office 3,073,843
Patented Jan. 15, 1963

3,073,843
PREPARATION OF N-HYDROXYMETHYL
PYRROLIDONE
Saul R. Buc, deceased, late of Easton, Pa., by Dolores M.
Buc, administratrix, Easton, Pa., assignor to General
Aniline & Film Corporation, New York, N.Y., a corporation of Delaware
No Drawing. Filed Dec. 16, 1960, Ser. No. 76,407
5 Claims. (Cl. 260—326.5)

This invention relates to the preparation of N-hydroxymethyl pyrrolidone and carbon substituted derivatives thereof.

An important object of this invention is to provide an improved process for the preparation of N-hydroxymethyl pyrrolidone in a simple, expeditious and economical process.

Another object of this invention is the provision of a process for the preparation of N-hydroxymethyl pyrrolidone by the reaction of pyrrolidone and formaldehyde.

A further object of this invention is the provision of a process for the preparation of N-hydroxmethyl pyrrolidone and carbon-substituted derivatives thereof in substantially quantitative yields.

Other objects of this invention will appear from the following detailed description.

The objects of this invention may be attained by reacting pyrrolidone with formaldehyde, or a formaldehyde-liberating substance, in the presence of a strongly alkaline catalyst, whereby the N-hydroxymethyl pyrrolidone corresponding to the starting material is formed in substantially quantitative amounts. No special precautions are needed, and in the preferred embodiment, no solvents or other reaction media are employed. It is not necessary that water be excluded from the process, but it is preferable that the reaction be carried out in the absence of substantial quantities of water, since water contaminates the product and is difficult to remove therefrom, even though it has no effect whatever on the reaction itself. The reactants are preferably employed in substantially equivalent quantities, though this is not critical. Excess formaldehydic reactant becomes an undesirable and difficultly separable contaminant in the product, while using excess pyrrolidone feed is economically undesirable.

As the alkaline catalyst, it is preferred to use an alkali metal hydroxide or carbonate, particularly sodium hydroxide, potassium hydroxide, sodium carbonate or potassium carbonate, while ammonium hydroxide will catalyze the reaction, it necessarily is added as an aqueous solution and would thus introduce the aforementioned processing difficulties into the recovery of the product. With ammonium carbonate, the reaction does not go to any extent. This is apparently due to the fact that application of heat is required to initiate the reaction, and the heat concomitantly acts to decompose the ammonium carbonate. Quaternary ammonium hydroxides are effective catalysts, but they usually involve the employment of aqueous media with the attendant difficulties in purifying the product.

The pyrrolidone reactant may be any one of a number of carbon-substituted pyrrolidones, as well as pyrrolidone itself. A number of such compounds will readily be suggested to one skilled in the art, among them being the carbon-substituted lower alkyl, lower alkoxy, lower alkyl thio, lower di(alkyl) amino, lower haloalkyl and alicyclic derivatives of pyrrolidone. The use of any carbon-substituted pyrrolidone, the substituent of which is non-reactive with formaldehyde, is within the scope of this invention, and includes such compounds as the 3-, 4- and 5-halo and dihalo pyrrolidones, nitropyrrolidones, phenyl-pyrrolidone, etc.

It will, of course, be apparent to one skilled in the art that any formaldehyde-liberating substance will be a suitable reactant, including formaldehyde itself, paraformaldehyde and trioxymethylene. Paraformaldehyde is preferred, since it may be added without any accompanying aqueous medium and it is readily depolymerized to formaldehyde under the reaction conditions.

The N-hydroxymethyl pyrrolidone products may be employed as intermediates in the preparation of dyestuffs, particularly as replacements for N-hydroxyphthalimide in the syntheses described in U.S. Patents Nos. 2,533,778; 2,536,984; 2,584,367; 2,584,368 and 2,535,987.

Moreover, they may be condensed with various alcohols, acids and aromatic ring-containing compounds to produce valuable surfactants.

Having generally described the invention, the following examples are given by way of specific ilustration:

*Example I*

85 grams of pyrrolidone was placed in a flask and 0.85 gram of solid potassium hydroxide (1% by weight based on the pyrrolidone) is added thereto. Immediately, a white suspension of potassium pyrrolidone began to form. 309 grams of paraformaldehyde was then added all at once. The temperature of the reaction mixture rose spontaneously to 80° C. with the formation of a clear homogeneous melt in which no trace of either potassium pyrrolidone or paraformaldehyde was discernible. The reaction was complete within about 30 seconds, and the melt was then slowly cooled. At 73.5° C. crystalline N-hydroxy-methyl pyrrolidone was recovered in substantially quantitative yield.

*Example II*

Example I was repeated, except that 0.025 gram of solid potassium hydroxide (0.03% by weight based on pyrrolidone) was employed instead of 0.85 gram. The reaction required about three minutes to reach completion, but in all other respects was similar to Example I.

When 5-methylpyrrolidone, 5-methoxy-pyrrolidone, 5-dimethylamino-pyrrolidone or 4-cyclohexyl pyrrolidine is substituted in either of the above examples, their corresponding N-hydroxymethyl derivatives are similarly obtained.

*Example III*

100 grams of pyrrolidone and 1 gram of potassium carbonate were placed in a flask and 363.5 grams of paraformaldehyde were added. The reaction, which was exothermic, required about 2 minutes to go to completion with results similar to those obtained in Example I.

*Example IV*

Example III was repeated using 0.03 gram of potassium carbonate. The reaction was sluggish, being largely completed after 15 minutes. After 2–3 minutes of gentle external heating, it reached completion with results similar to those obtained in Example I.

*Examples V and VI*

Examples III and IV were each repeated, substituting sodium carbonate for potassium carbonate.

With 1 gram of sodium carbonate, the reaction required fifteen minutes, plus a short period of gentle external heating, to reach completion.

With 0.03 gram of sodium carbonate it was necessary to heat the reactants continuously throughout the reaction period in order to maintain the temperature at 80° C.

The results obtained were similar to those obtained in Example I.

*Examples VII and VIII*

Examples I and II were repeated, substituting 0.85 gram and 0.025 gram, respectively, of solid sodium hydroxide for potassium hydroxide. In both cases, the reaction reached completion within 3 minutes. When the larger quantity of sodium hydroxide was employed, a substantial portion of it remained undissolved throughout, but this did not in any way affect the result of the reaction.

When freshly prepared formaldehyde (40% aqueous solution) or solid trioxymethylene was substituted for paraformaldehyde, the reaction proceeded in the same manner as described. With aqueous formaldehyde, it was found that it was necessary to separate the aqueous contaminant by a vacuum distillation step.

It will be readily apparent to one skilled in the art that various other modifications may be employed without departing from the spirit and scope of this invention.

What is claimed is:

1. The method of making N-hydroxymethyl pyrrolidone by reacting in the absence of an aqueous medium and in the presence of a strong alkaline catalyst selected from the group consisting of the hydroxides and carbonates of the alkali metals, pyrrolidone with a compound selected from the group consisting of formaldehyde and those compounds which liberate formaldehyde under the reaction conditions.

2. The method according to claim 1 in which the catalyst is present in the amount of 0.1 to 1.0% by weight, based on the pyrrolidone feed.

3. The method of claim 1 in the catalyst is potassium hydroxide in the amount of 0.03 to 1.0% by weight, based on the pyrrolidone feed.

4. The method of claim 1 in which the catalyst is sodium hydroxide in the amount of 0.03% by weight based on the pyrrolidone feed.

5. The method of claim 1 in which the reactants are employed in substantially equivalent amounts.

References Cited in the file of this patent

UNITED STATES PATENTS 2,526,517   Tawney _____ Oct. 17, 1950

OTHER REFERENCES

Shostakovski et al.: Izvest. Akad. Nauk S.S.S.R., Otdel. Khim. Nauk, page 762 (1957).

UNITED STATES PATENT OFFICE
CERTIFICATE OF CORRECTION

Patent No. 3,073,843                 January 15, 1963

Saul R. Buc, deceased, by Dolores M. Buc, administratrix

It is certified that error appears in the above identified patent and that said Letters Patent are hereby corrected as shown below:

Column 2, line 23, "309 grams" should read -- 30 grams --.

Signed and sealed this 21st day of October 1969.

(SEAL)
Attest:

Edward M. Fletcher, Jr.
Attesting Officer

WILLIAM E. SCHUYLER, JR.
Commissioner of Patents